(12) United States Patent
Watanuki

(10) Patent No.: US 11,002,197 B2
(45) Date of Patent: May 11, 2021

(54) CONTROL DEVICE FOR INTERNAL COMBUSTION ENGINE

(71) Applicant: Mitsubishi Electric Corporation, Tokyo (JP)

(72) Inventor: Takuo Watanuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/448,667

(22) Filed: Jun. 21, 2019

(65) Prior Publication Data

US 2019/0390608 A1 Dec. 26, 2019

(30) Foreign Application Priority Data

Jun. 26, 2018 (JP) .............................. JP2018-120986

(51) Int. Cl.
*F02D 23/00* (2006.01)
*F02D 13/02* (2006.01)
(Continued)

(52) U.S. Cl.
CPC .............. *F02D 23/00* (2013.01); *F02D 9/02* (2013.01); *F02D 9/04* (2013.01); *F02D 13/0203* (2013.01);
(Continued)

(58) Field of Classification Search
CPC ........ F02D 41/18; F02D 41/0007; F02D 9/04; F02D 9/02; F02D 2200/0411;
(Continued)

(56) References Cited

U.S. PATENT DOCUMENTS 4,928,654 A * 5/1990 Hosaka .................. F02D 41/18
123/480
4,947,816 A * 8/1990 Nakaniwa ............... F02D 37/02
123/406.46

(Continued)

FOREIGN PATENT DOCUMENTS

| JP | 4335249 B2 | 9/2009 |
| JP | 2010-285957 A | 12/2010 |
| JP | 5379918 B1 | 12/2013 |

OTHER PUBLICATIONS

Communication dated May 21, 2019, from the Japanese Patent Office in counterpart Application No. 2018-120986.

*Primary Examiner* — Patrick Hamo
*Assistant Examiner* — Wesley G Harris
(74) *Attorney, Agent, or Firm* — Sughrue Mion, PLLC; Richard C. Turner (57) ABSTRACT

A control device for an internal combustion engine includes an intake air amount controller and a variable valve controller. The intake air amount controller includes an exhaust manifold pressure calculator, an engine intake air amount calculator, a volumetric efficiency correction coefficient calculator, a cylinder intake air amount calculator, an exhaust gas flow rate calculator, and a cylinder intake air amount controller. The volumetric efficiency correction coefficient calculator calculates a volumetric efficiency correction coefficient based on a pressure ratio between an intake manifold pressure and an exhaust manifold pressure, a rotational speed of the internal combustion engine, and an actuation state of at least one of an intake valve and an exhaust valve.

6 Claims, 6 Drawing Sheets

(51) Int. Cl.
  *F02D 9/02* (2006.01)
  *F02D 9/04* (2006.01)
  *F02D 41/00* (2006.01)
  *F02D 41/18* (2006.01)

(52) U.S. Cl.
  CPC ......... *F02D 41/0007* (2013.01); *F02D 41/18* (2013.01); *F02D 2009/023* (2013.01); *F02D 2009/0228* (2013.01); *F02D 2041/001* (2013.01); *F02D 2200/0402* (2013.01); *F02D 2200/0406* (2013.01); *F02D 2200/0411* (2013.01); *F02D 2200/101* (2013.01)

(58) Field of Classification Search
  CPC ....... F02D 2200/0406; F02D 2009/023; F02D 2009/0228; F02D 2200/101; F02D 2041/001; F02D 2200/0402; F02D 13/0215; F02D 41/0002; F02D 41/145; F02D 13/0238; F02D 13/0269; F02D 2200/0414; F02D 23/00; F02B 37/18
  See application file for complete search history.

(56) References Cited

U.S. PATENT DOCUMENTS

| | | | | |
|---|---|---|---|---|
| 4,957,088 | A * | 9/1990 | Hosaka | ................. F02D 41/107 |
| | | | | 123/480 |
| 4,967,715 | A * | 11/1990 | Hosaka | ................. F02D 41/045 |
| | | | | 123/478 |
| 5,050,084 | A * | 9/1991 | Nakaniwa | ............. F02D 41/008 |
| | | | | 123/492 |
| 6,530,360 | B1 * | 3/2003 | Kondo | .................... F02B 75/22 |
| | | | | 123/406.14 |
| 6,662,640 | B2 * | 12/2003 | Yagi | .................... F02D 41/1401 |
| | | | | 73/114.31 |
| 9,541,012 | B2 * | 1/2017 | Saito | ...................... F02D 23/00 |

* cited by examiner

CONTROL DEVICE FOR INTERNAL COMBUSTION ENGINE

BACKGROUND OF THE INVENTION

1. Field of the Invention

The present invention relates to a control device for an internal combustion engine, and more particularly, to a control device for an internal combustion engine, which is configured to calculate an amount of air sucked into a cylinder of the engine with high precision.

2. Description of the Related Art

In controlling an internal combustion engine, namely an engine, it is important to calculate a "cylinder intake air amount", which corresponds to an amount of air sucked into a cylinder from an intake pipe, with high precision, and perform fuel control and ignition control based on the cylinder intake air amount.

Hitherto, a speed density (S/D) method is known as a method of calculating the cylinder intake air amount.

In the S/D method, a volumetric efficiency correction coefficient Kv for associating an amount of air sucked into the intake pipe and the cylinder intake air amount with each other is calculated based on a pressure in an intake manifold and a rotational speed of an engine. In the S/D method, the cylinder intake air amount is then calculated based on the amount of air sucked into the intake pipe, the volumetric efficiency correction coefficient Kv, a cylinder volume V, and an air temperature T.

In recent years, an engine has been commonly mounted with a variable valve timing (VVT) mechanism configured to variably control opening and closing timings of an intake valve and an exhaust valve, namely an intake and exhaust VVT mechanism.

In the engine mounted with the intake and exhaust VVT mechanism, an amount of exhaust gas blown from an exhaust passage back to the cylinder changes depending on a difference in opening and closing timings of the valves, and a substantial compression ratio changes. Therefore, even under a state of the same intake manifold pressure and the same rotational speed, the cylinder intake air amount greatly varies due to the difference in opening and closing timings of the valves.

Therefore, when the S/D method is employed in the engine mounted with the intake and exhaust VVT mechanism, the calculation precision of the cylinder intake air amount deteriorates unless an influence of the opening and closing timings of the valves on the volumetric efficiency correction coefficient Kv is taken into consideration.

In order to solve the above-mentioned problem, there is proposed a technology for calculating the cylinder intake air amount of the engine mounted with the intake and exhaust VVT mechanism (see, for example Japanese Patent No. 4335249).

In Japanese Patent No. 4335249, a flow rate of air sucked into the intake pipe, namely an "engine intake air flow rate", is measured by an air flow sensor provided to an upstream portion of a throttle valve of the intake pipe. In this method, an intake system is modeled based on only the law of conservation of mass, and the cylinder intake air amount is calculated from the engine intake air flow rate by taking the volumetric efficiency correction coefficient Kv into consideration.

In Japanese Patent No. 4335249, a plurality of maps, in each of which the volumetric efficiency correction coefficient Kv is stored, are used in association with respective actuation states of an intake VVT phase angle and an exhaust VVT phase angle. For example, an actuation range of the intake VVT phase angle is represented by six representative points, and an actuation range of the exhaust VVT phase angle is represented by six representative points, to thereby used 6×6=36 maps of the volumetric efficiency correction coefficient Kv.

Hitherto, there is also known a turbocharger in which a supercharger for rotating a turbine with the exhaust gas is mounted to an intake passage of the engine for the purpose of improving output of the engine. In the turbocharger, an exhaust bypass passage is generally mounted upstream of the turbine.

In the turbocharger, a waste gate valve is also provided midway through the exhaust bypass passage to divert a part of the exhaust gas flowing in the exhaust passage to the exhaust bypass passage, and adjust an inflow amount of the exhaust gas into the turbine, to thereby control a boost pressure to an appropriate level.

Specifically, when an opening degree of the waste gate valve is controlled to an opening side, the inflow amount of the exhaust gas into the turbine decreases, and hence the boost pressure is lowered. Meanwhile, when the opening degree of the waste gate valve is controlled to a closing side, the inflow amount of the exhaust gas into the turbine increases, and hence the boost pressure is raised. That is, the controlling of the opening degree of the waste gate valve to the opening side or the closing side lowers or raises the pressure in the exhaust passage upstream of the turbine, namely an exhaust pressure.

However, in Japanese Patent No. 4335249, an influence of the exhaust pressure on the volumetric efficiency correction coefficient Kv is not taken into consideration. In an engine mounted with a turbocharger in which the exhaust pressure greatly varies depending on the opening degree of the waste gate valve, even with the same intake manifold pressure, the same rotational speed of the engine, and the same opening and closing timings of the intake valve and the exhaust valve, the calculation precision of the cylinder intake air amount deteriorates unless the influence of the exhaust pressure on the volumetric efficiency correction coefficient Kv is taken into consideration.

In order to solve the above-mentioned problem, there is proposed a technology for calculating the volumetric efficiency correction coefficient Kvy through use of a parameter for correction of the volumetric efficiency correction coefficient Kv including the exhaust pressure, to thereby calculate the cylinder intake air amount with high precision (see, for example Japanese Patent No. 5379918).

In Japanese Patent No. 5379918, the parameter for the correction of the volumetric efficiency correction coefficient Kv calculated based on the intake manifold pressure and the rotational speed of the engine is calculated in consideration of the exhaust pressure. Then, in Japanese Patent No. 5379918, this parameter for the correction is used to correct the volumetric efficiency correction coefficient Kv, to thereby calculate the cylinder intake air amount of the engine mounted with the supercharger with high precision.

However, the parameter for the correction, which is described in Japanese Patent No. 5379918, presupposes a configuration mounted with a supercharger and an intake and exhaust VVT model. This inhibits the technology proposed in Japanese Patent No. 5379918 from calculating the parameter for the correction in a case of a configuration without a supercharger or an intake and exhaust VVT mechanism.

SUMMARY OF THE INVENTION

The present invention has been made in order to solve the above-mentioned problem, and has an object to provide a control device for an internal combustion engine, which is capable of calculating a cylinder intake air amount with high precision without depending on whether or not a supercharger and an intake and exhaust VVT mechanism are mounted.

In order to solve the above-mentioned problem, according to one embodiment of the present invention, there is provided a control device for an internal combustion engine, the control device comprising: an engine intake air amount calculator configured to calculate an engine intake air amount being an amount of air sucked into an intake pipe of the internal combustion engine; an intake manifold pressure measurer configured to measure an intake manifold pressure of the internal combustion engine; an exhaust manifold pressure calculator configured to calculate an exhaust manifold pressure of the internal combustion engine; a rotational speed measurer configured to measure a rotational speed of the internal combustion engine; a variable valve controller configured to variably control an actuation state of at least one of an intake valve and an exhaust valve of the internal combustion engine; a volumetric efficiency correction coefficient calculator configured to calculate a volumetric efficiency correction coefficient for associating the engine intake air amount and a cylinder intake air amount being an amount of air sucked into a cylinder of the internal combustion engine with each other; and a cylinder intake air amount calculator configured to calculate the cylinder intake air amount being the amount of air sucked into the cylinder from the intake pipe based on the engine intake air amount and the volumetric efficiency correction coefficient, wherein the volumetric efficiency correction coefficient calculator calculates the volumetric efficiency correction coefficient based on a pressure ratio between the intake manifold pressure and the exhaust manifold pressure, the rotational speed, and the actuation state of at least one of the intake valve and the exhaust valve.

With the control device for an internal combustion engine according to one embodiment of the present invention, the volumetric efficiency correction coefficient is calculated based on the pressure ratio between the intake manifold pressure and the exhaust manifold pressure, the rotational speed of the internal combustion engine, and the actuation state of at least one of the intake valve and the exhaust valve, and hence it is possible to calculate a cylinder intake air amount with high precision without depending on whether or not a supercharger and an intake and exhaust VVT mechanism are mounted.

DESCRIPTION OF THE EMBODIMENTS

Now, a control device for an internal combustion engine according to embodiments of this disclosure is described in detail with reference to the accompanying drawings. The embodiments described below are merely examples, and the present invention is not limited to those embodiments. In the following description, like components are denoted by like reference numerals.

First Embodiment

Figure 1:
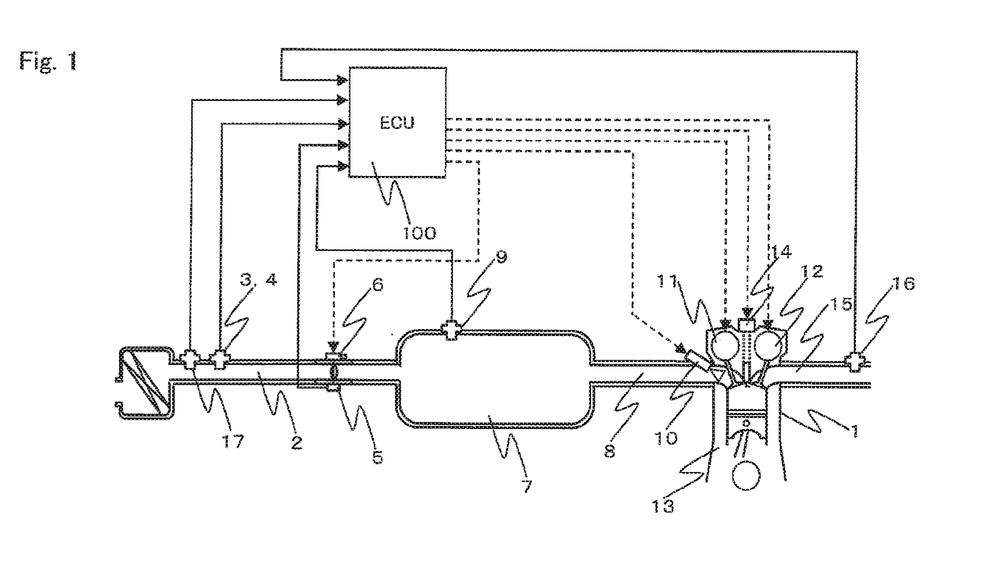
FIG. 1 is a configuration diagram for schematically illustrating a control device for an internal combustion engine according to a first embodiment of the present invention.

FIG. 1 is a configuration diagram for schematically illustrating a control device for an internal combustion engine according to a first embodiment of the present invention.

In FIG. 1, an air flow sensor 3 configured to measure a flow rate of air sucked from an intake pipe 2, namely an engine intake air flow rate Qar (g/s), is provided upstream of the intake pipe 2, which forms an intake system of an engine 1. In addition, an intake air temperature sensor 4 is provided in the vicinity of the air flow sensor 3. In FIG. 1, the air flow sensor 3 and the intake air temperature sensor 4 are integrally formed.

An electronically controlled throttle valve 5 configured to adjust the engine intake air flow rate Qar is provided downstream of the air flow sensor 3. The throttle valve 5 is provided with a throttle position sensor 6 configured to measure a throttle opening degree.

A pressure sensor 9 configured to measure a pressure Pim in a surge tank 7 and an intake manifold 8 is provided downstream of the throttle valve 5. In the following description, the pressure Pim measured by the pressure sensor 9 is referred to simply as an "intake manifold pressure Pim".

Instead of using the air flow sensor 3 to measure the engine intake air flow rate Qar, it is possible to employ a so-called S/D method of estimating the engine intake air flow rate Qar based on the intake manifold pressure Pim measured by the pressure sensor 9. In that case, the intake air temperature sensor 4 may be provided inside the intake manifold 8.

An injector 10 configured to inject fuel is provided in the vicinity of a connecting portion between the intake manifold 8 and the engine 1. An intake VVT mechanism 11 and an exhaust VVT mechanism 12, each of which is configured to variably control a valve timing, are provided to an intake valve (not shown) and an exhaust valve (not shown) of the engine 1, respectively. Only one of the intake VVT mechanism 11 and the exhaust VVT mechanism 12 may be provided, or neither thereof may be provided.

An ignition coil 14 is provided to a head portion of a cylinder 13 of the engine 1. The ignition coil 14 drives a spark plug (not shown) in the cylinder 13.

An exhaust manifold 15 is provided with an air-fuel ratio sensor 16 and a catalyst (not shown). In addition, an atmospheric pressure sensor 17 is provided near an inlet of the intake pipe 2.

Information measured by the above-mentioned various sensors 3, 4, 6, 9, 16, and 17 are input to an ECU 100 formed of, for example a microcomputer as information indicating an operation state of the engine 1.

The ECU 100 calculates a target torque of the engine 1 based on the information measured by the various sensors 3, 4, 6, 9, 16, and 17. In order to achieve the calculated target torque, the ECU 100 controls an opening degree of the throttle valve 5 based on a target intake air amount, an air-fuel ratio AF, and various target control values, for example an opening degree of the intake VVT mechanism 11, an opening degree of the exhaust VVT mechanism 12, an EGR rate, and an ignition timing, etc.

Figure 2:
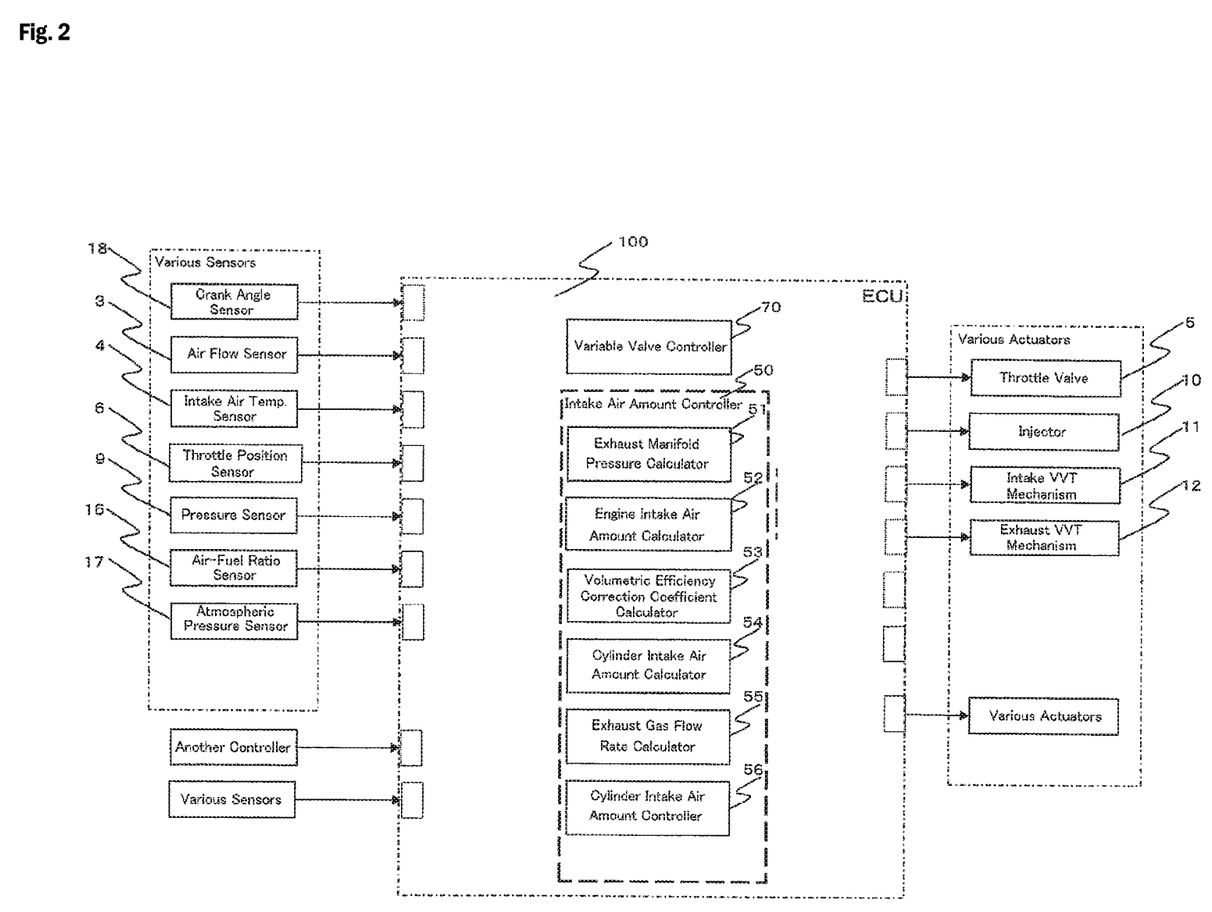
FIG. 2 is a block diagram for illustrating a schematic configuration of an engine controller in the first embodiment of the present invention.

FIG. 2 is a block diagram for illustrating a schematic configuration of an engine controller in the first embodiment of the present invention.

The information measured by the above-mentioned various sensors 3, 4, 6, 9, 16, and 17, which are configured to measure the operation state of the engine 1, and information measured by a crank angle sensor 18 are input to the ECU 100.

The ECU 100 further outputs instruction values to the above-mentioned various actuators 5, 10, 11, and 12 and other such component, which are configured to control the engine 1.

Instead of using the atmospheric pressure sensor 17 to measure the atmospheric pressure, it is possible to employ another means to estimate the atmospheric pressure. The atmospheric pressure sensor 17 may also be built into the ECU 100.

The ECU 100 also comprises an intake air amount controller 50 configured to control an amount of air sucked into the cylinder 13 of the engine 1 from the intake pipe 2, namely the cylinder intake air amount. The ECU 100 further comprises a variable valve controller 70 configured to control an actuation state of at least one of the intake valve and the exhaust valve of the engine 1.

<Intake Air Amount Controller 50>

The intake air amount controller 50 comprises an exhaust manifold pressure calculator 51, an engine intake air amount calculator 52, a volumetric efficiency correction coefficient calculator 53, a cylinder intake air amount calculator 54, an exhaust gas flow rate calculator 55, and a cylinder intake air amount controller 56.

(Exhaust Manifold Pressure Calculator 51)

The exhaust manifold pressure calculator 51 calculates a pressure Pex in the exhaust manifold 15 based on an exhaust gas flow rate Qex calculated by the exhaust gas flow rate calculator 55.

The pressure Pex in the exhaust manifold 15 is hereinafter referred to simply as an "exhaust manifold pressure Pex".

(Engine Intake Air Amount Calculator 52)

The engine intake air amount calculator 52 calculates an engine intake air amount (g), which is an amount of air sucked into the intake pipe 2, based on the engine intake air flow rate Qar (g/s) measured by the air flow sensor 3.

(Volumetric Efficiency Correction Coefficient Calculator 53)

The volumetric efficiency correction coefficient calculator 53 calculates a volumetric efficiency correction coefficient Kv for associating the engine intake air amount and the amount of air sucked into the cylinder 13 from the intake pipe 2 with each other.

(Cylinder Intake Air Amount Calculator 54)

The cylinder intake air amount calculator 54 calculates the amount of air sucked into the cylinder 13 from the intake pipe 2, namely the cylinder intake air amount.

Specifically, the cylinder intake air amount calculator 54 calculates the cylinder intake air amount from the engine intake air amount calculated by the engine intake air amount calculator 52 in consideration of the volumetric efficiency correction coefficient Kv calculated by the volumetric efficiency correction coefficient calculator 53.

More specifically, the cylinder intake air amount calculator 54 calculates the cylinder intake air amount based on such theoretical consideration as described below. In the following description, FIG. 1 is to be referred to together.

First, Equation (1) is established when the law of conservation of mass is applied to fresh air in a region indicated by a volume Vs (cm³) of the intake pipe 2 extending from a downstream side of the throttle valve 5 to an inlet of the cylinder 13 of the engine 1.

$$Qar(n)T(n) - Qcr(n)T(n) = \{\rho a(n) - \rho a(n-1)\}Vs \quad (1)$$

In Equation (1), n represents a value indicating a freely-selected stroke of the engine 1, Qar(n) (g/s) represents an average value in the stroke n of the engine intake air flow rate Qar measured by the air flow sensor 3, Qcr(n) (g/s) represents an average value in the stroke n of a cylinder intake air flow rate Qcr, T(n) (s) represents a time required for the stroke n, for example a time required for 180 deg crank angle (CA) in a case of a four-cylinder engine, and $\rho a(n)$ (g/cm³) represents an average value in the stroke n of a fresh air density in the intake pipe 2.

When a volumetric efficiency correction coefficient in the stroke n of the air sucked into the cylinder 13 from the intake pipe 2 is represented by Kv(n), a cylinder intake air amount Qcr(n)T(n) (g) in the stroke n is expressed by Equation (2) using a stroke volume Vc (cm³) of the cylinder 13 per cylinder.

$$Qcr(n)T(n) = Kv(n)\rho a(n)Vc \quad (2)$$

When an Equation obtained by substituting Equation (2) into Equation (1) to erase the fresh air density $\rho a(n)$ in the stroke n is solved for the cylinder intake air amount Qcr(n)T(n) in the stroke n, Equation (3) is obtained.

$$Qcr(n)T(n) = \frac{Kv(n)}{Kv(n-1)} KfQcr(n-1)T(n-1) + (1 - Kf)Qcr(n)T(n) \quad (3)$$

In Equation (3), Kf represents a filter constant, and is defined by Equation (4).

$$Kf = \frac{Vs}{\{Vs + Kv(n) + Vc\}} \quad (4)$$

The cylinder intake air amount calculator 54 calculates the cylinder intake air amount Qcr(n)T(n) based on the theoretical consideration as described above.

(Exhaust Gas Flow Rate Calculator 55)

The exhaust gas flow rate calculator 55 calculates the exhaust gas flow rate Qex based on the cylinder intake air amount calculated by the cylinder intake air amount calculator 54 and the air-fuel ratio AF measured by the air-fuel ratio sensor 16.

(Cylinder Intake Air Amount Controller 56)

The cylinder intake air amount controller 56 calculates the target torque of the engine 1 based on information including, for example a rotational speed Ne of the engine 1 and an accelerator opening degree measured by an accelerator opening degree sensor (not shown), etc.

The cylinder intake air amount controller 56 adjusts the opening degree of the throttle valve 5 based on the calculated target torque so that an engine intake air amount Qar(n)T(n) becomes equal to the cylinder intake air amount Qcr(n)T(n).

<Calculation of Cylinder Intake Air Amount>

Next, Calculation of the cylinder intake air amount, which is performed by the intake air amount controller 50 in the first embodiment of the present invention, is described with reference to a flow chart of FIG. 3.

Figure 3:
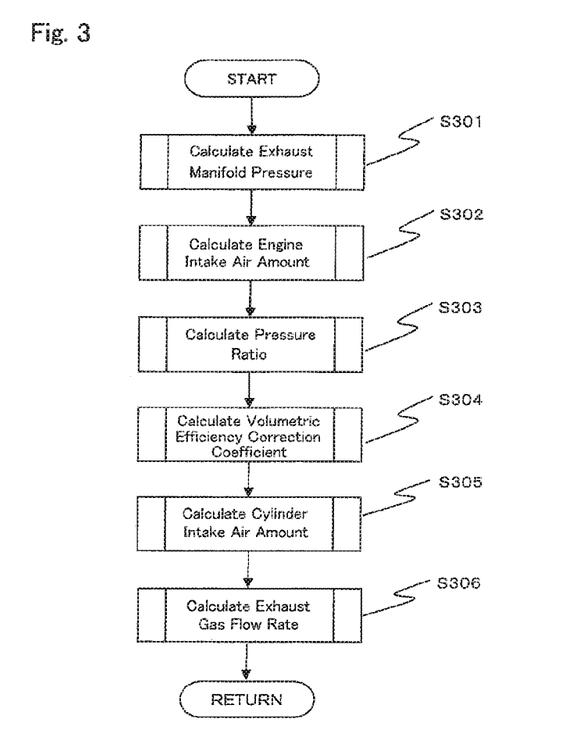
FIG. 3 is a flow chart for illustrating processing for calculating a cylinder intake air amount in the first embodiment of the present invention.

The processes of the flowchart of FIG. 3 are executed as an interruption of the ECU 100 every time the crank angle of the engine 1 becomes a predetermined angle.

In Step S301, the exhaust manifold pressure calculator 51 calculates the exhaust manifold pressure Pex based on the exhaust gas flow rate Qex calculated by the exhaust gas flow rate calculator 55 at a time of the previous interruption.

Specifically, the exhaust manifold pressure calculator 51 first uses a pressure ratio map MAP1 to calculate an atmospheric pressure-pressure ratio Pr corresponding to the exhaust gas flow rate Qex according to Equation (5).

$$Pr=\text{MAP1}(Qex) \qquad (5)$$

In Equation (5), the atmospheric pressure-pressure ratio Pr represents a pressure ratio between the exhaust manifold pressure Pex and an atmosphere pressure P1.

In the pressure ratio map MAP1, a relationship between the exhaust gas flow rate Qex and the atmospheric pressure-pressure ratio Pr=Pex/P1 is previously stored. The pressure ratio map MAP1 can be created in advance based on experimental data measured by the engine 1.

Characteristics of the pressure ratio map MAP1 depend on exhaust resistances of, for example a catalyst and a muffler provided downstream of the exhaust manifold 15, etc.

The exhaust manifold pressure calculator 51 calculates the exhaust manifold pressure Pex based on the atmospheric pressure-pressure ratio Pr=Pex/P1 and the atmosphere pressure P1.

Specifically, the exhaust manifold pressure Pex is calculated by multiplying the atmospheric pressure-pressure ratio Pr=Pex/P1 by the atmosphere pressure P1 according to Equation (6).

$$Pex=Pr \times P1 \qquad (6)$$

When a turbocharger is not mounted to the engine 1, the exhaust manifold pressure Pex is the same as a pressure in an exhaust passage, namely an exhaust pressure.

In Step S302, the engine intake air amount calculator 52 calculates the engine intake air amount Qar(n)T(n) in the current stroke n based on the engine intake air flow rate Qar(n) in the current stroke n measured by the air flow sensor 3, and stores the calculated engine intake air amount Qar (n)T(n) in an internal memory of the ECU 100.

When the air flow sensor 3 is a mass flow meter, the measured values of the air flow sensor 3 are sampled and integrated, for example every 1.25 ms. Then, the engine intake air amount Qar(n)T(n) in the current stroke n is calculated based on the integrated values during a period from one stroke before, namely from the interruption in the stroke n−1, to the current interruption.

Meanwhile, when the air flow sensor 3 is a volumetric flow meter, the engine intake air amount Qar(n)T(n) in the current stroke n is calculated by converting a volume into a mass based on a standard atmospheric density, the atmosphere pressure P1 measured by the atmospheric pressure sensor 17, and an intake air temperature To measured by the intake air temperature sensor 4.

In Step S303, the volumetric efficiency correction coefficient calculator 53 calculates a pressure ratio Rpkv (=Pim/Pex) for a volumetric efficiency correction coefficient based on the intake manifold pressure Pim measured by the pressure sensor 9 and the exhaust manifold pressure Pex calculated by the exhaust manifold pressure calculator 51.

In Step S304, the volumetric efficiency correction coefficient calculator 53 calculates the volumetric efficiency correction coefficient Kv(n) in the current stroke n based on the rotational speed Ne of the engine 1 measured by the crank angle sensor 18, the pressure ratio Rpkv for the volumetric efficiency correction coefficient, and the most recent actuation state of the intake valve and the exhaust valve obtained by the variable valve controller 70, and stores the calculated volumetric efficiency correction coefficient Kv(n) in the internal memory of the ECU 100.

Specifically, in a reference actuation state of the intake valve and the exhaust valve of the engine 1, a relationship of the rotational speed Ne and the pressure ratio Rpkv with respect to the volumetric efficiency correction coefficient Kv is experimentally measured in advance, and is stored in the internal memory of the ECU 100 as a MAP2.

At a timing of the interruption, the volumetric efficiency correction coefficient calculator 53 first performs mapping according to Equation (7) using the rotational speed Ne and the pressure ratio Rpkv in the current stroke n.

$$Kv(n)'=\text{MAP2}(Ne,Rpkv) \qquad (7)$$

Subsequently, the volumetric efficiency correction coefficient calculator 53 calculates the volumetric efficiency correction coefficient Kv(n) in the current stroke n by correcting the value of Kv(n)' obtained by the above-mentioned mapping, based on a deviation between the most recent actuation state of the intake valve and the exhaust valve and the above-mentioned reference actuation state, according to Equation (8).

$$Kv(n)=\text{correction}(Kv(n)') \qquad (8)$$

In Step S305, the cylinder intake air amount calculator 54 calculates the cylinder intake air amount Qcr(n)T(n) in the current stroke n.

Specifically, the cylinder intake air amount calculator 54 first calculates the filter constant Kf according to Equation (4), from the volumetric efficiency correction coefficient Kv(n) in the current stroke n, the volume Vs of the intake pipe 2, and the stroke volume Vc of the cylinder 13 per cylinder.

Subsequently, the cylinder intake air amount calculator 54 calculates the cylinder intake air amount Qcr(n)T(n) in the current stroke n according to Equation (3) from the calculated filter constant Kf, the volumetric efficiency correction coefficient Kv(n) in the current stroke n, the engine intake air amount Qar(n)T(n) in the current stroke n, and the volumetric efficiency correction coefficient Kv(n−1) and the cylinder intake air amount Qcr(n−1)T(n−1) in the previous stroke n−1, and stores the calculated cylinder intake air amount Qcr(n)T(n) in the internal memory of the ECU 100.

The volumetric efficiency correction coefficient Kv(n−1) and the cylinder intake air amount Qcr(n−1)T(n−1) in the previous stroke n−1 were calculated at the time of the previous interruption in Step S304 and Step S305, respectively, and have been stored in the internal memory of the ECU 100.

In addition, in Step S306, the exhaust gas flow rate calculator 55 calculates the exhaust gas flow rate Qex of the engine 1 based on the cylinder intake air amount Qcr(n)T(n) calculated in Step S304 and the air-fuel ratio AF measured by the air-fuel ratio sensor 16, and stores the calculated exhaust gas flow rate Qex in the internal memory of the ECU 100.

As described above, the intake air amount controller 50 in the first embodiment of the present invention calculates the cylinder intake air amount Qcr(n)T(n) from the engine intake air flow rate Qar(n) measured by the air flow sensor 3 in consideration of the volumetric efficiency correction coefficient Kv(n).

The volumetric efficiency correction coefficient Kv(n) is calculated based on the rotational speed Ne of the engine 1, the pressure ratio Rpkv for the volumetric efficiency correction coefficient, and the most recent actuation state of the intake valve and the exhaust valve.

Therefore, even in a case of an engine mounted with at least one of an intake VVT mechanism and an exhaust VVT mechanism, the cylinder intake air amount Qcr(n)T(n) can be calculated from the engine intake air flow rate Qar(n) with high precision.

In the first embodiment described above, the volumetric efficiency correction coefficient calculator 53 stores the volumetric efficiency correction coefficient Kv' in the reference actuation state of the intake valve and the exhaust valve in the form of a map, and calculates the volumetric efficiency correction coefficient Kv by correcting the value of Kv' obtained by the mapping based on the deviation between the reference actuation state and the most recent actuation state of the intake valve and the exhaust valve.

Instead of the above-mentioned method, for example, a plurality of maps, in each of which the relationship of the rotational speed Ne and the pressure ratio Rpkv with respect to the volumetric efficiency correction coefficient Kv is stored, may be used in association with respective actuation states of the intake valve and the exhaust valve in terms of their lift amounts and their phase angles.

In another case, as a simpler method, the relationship of the rotational speed Ne and the pressure ratio Rpkv with respect to the volumetric efficiency correction coefficient Kv may be previously stored in the form of a map for each of only two states of the intake valve and the exhaust valve at a time of actuation thereof and at a time of non-actuation thereof.

In this case, at the time of the actuation of the intake valve and the exhaust valve, the volumetric efficiency correction coefficient Kv is calculated using the map for the operation, while at the time of the non-actuation of the intake valve and the exhaust valve, the volumetric efficiency correction coefficient Kv is calculated using the map for the non-actuation.

Second Embodiment

Figure 4:
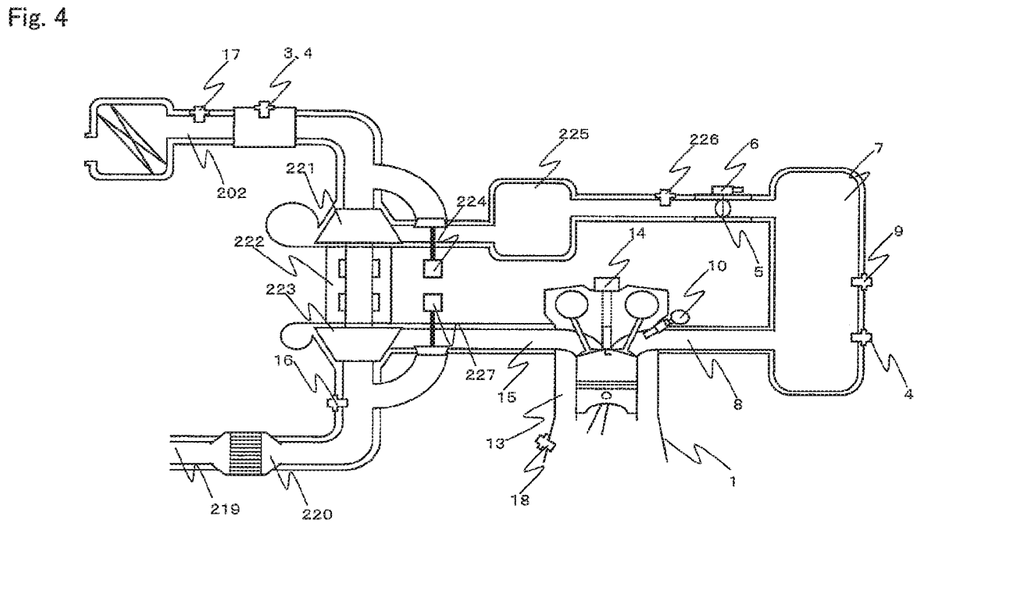
FIG. 4 is a configuration diagram for schematically illustrating a control device for an internal combustion engine according to a second embodiment of the present invention.

Next, a control device for an internal combustion engine according to a second embodiment of the present invention is described. FIG. 4 is a configuration diagram for schematically illustrating the control device for an internal combustion engine according to the second embodiment of the present invention.

In FIG. 4, the crank angle sensor 18 configured to measure a rotation angle of the crank is mounted to a crank (not shown) of the engine 1.

In addition, an intake pipe 202 forming an intake passage and an exhaust pipe 219 forming an exhaust passage are connected to a suction port (not shown) and an outlet (not shown) of a combustion chamber of the engine 1, respectively.

In the same manner as in the first embodiment, the air flow sensor 3 and the intake air temperature sensor 4 are provided downstream of the intake pipe 202. In FIG. 4, the air flow sensor 3 and the intake air temperature sensor 4 are integrally formed.

In addition, the atmospheric pressure sensor 17 configured to measure the atmospheric pressure is provided near an inlet of the intake pipe 202.

An exhaust gas purification catalyst 220 is provided upstream of the exhaust pipe 219. The air-fuel ratio sensor 16 is provided upstream of the exhaust gas purification catalyst 220.

In addition, an intake and exhaust system formed of the intake pipe 202 and the exhaust pipe 219 is provided with a compressor 221 and a turbocharger 222. As is well known, the turbocharger 222 is a supercharger comprising a turbine 223.

The turbine 223 is provided upstream of the exhaust pipe 219. The turbine 223 is rotationally driven by the exhaust gas flowing through the exhaust pipe 219.

The compressor 221 is provided downstream of the intake pipe 202. The compressor 221 is rotationally driven in conjunction with rotation of the turbine 223 to compress air in the intake pipe 202.

An air bypass valve 224 is provided downstream of the compressor 221. The air bypass valve 224 is configured to divert a compressed air flow to the intake pipe 202 so as to prevent a compressed boost pressure from flowing backward to damage the turbine 223 mainly when an accelerator is turned off.

An intercooler 225 is provided downstream of the air bypass valve 224. The throttle valve 5 configured to adjust the amount of air to be sent to the engine 1 is provided downstream of the intercooler 225.

The throttle valve 5 is connected to the throttle position sensor 6 configured to measure the throttle opening degree. In addition, a pressure sensor 226 configured to measure an air pressure between the intercooler 225 and the throttle valve 5 is provided upstream of the throttle valve 5.

In addition, the surge tank 7 configured to eliminate intake pulsation is provided downstream of the throttle valve 5. The pressure sensor 9 configured to measure an air pressure in the surge tank 7 is provided to the surge tank 7.

Both the air flow sensor 3 and the pressure sensor 9 may be provided, but only the pressure sensor 9 may be provided. However, when only the pressure sensor 9 is provided, as illustrated in FIG. 4, the intake air temperature sensor 4 is provided separately from the surge tank 7.

The injector 10 configured to inject fuel is provided downstream of the surge tank 7. The injector 10 may be provided so as to directly inject fuel into the cylinder 13. In addition, the ignition coil 14 is provided to a top portion of the cylinder 13.

In addition, a waste gate valve 227 is provided upstream of the turbine 223. The waste gate valve 227 diverts the exhaust gas to an exhaust bypass passage so as to prevent the engine 1 from being damaged even when the boost pressure increases at high rotation and with high load.

Figure 5:
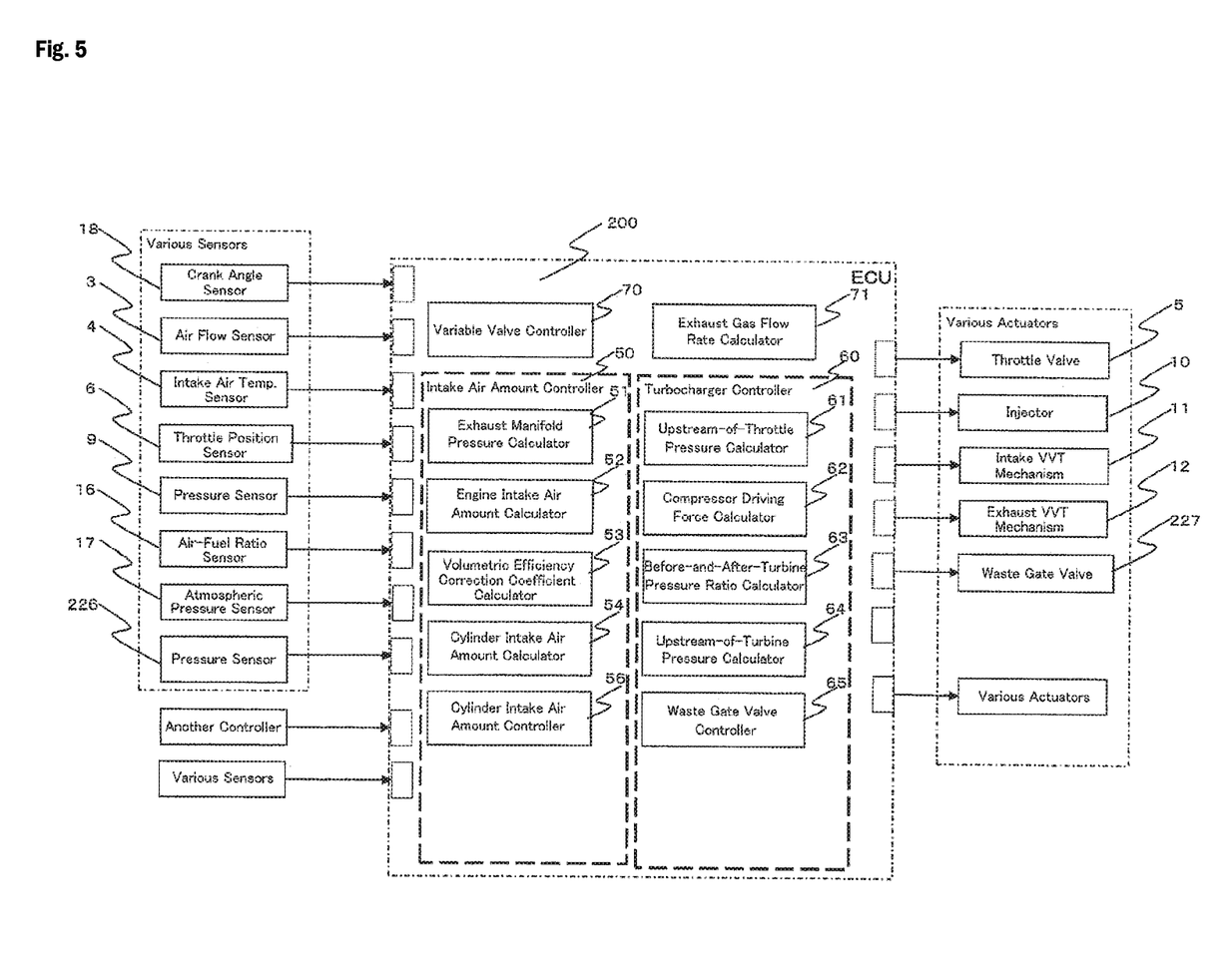
FIG. 5 is a block diagram for illustrating a schematic configuration of an engine controller in the second embodiment of the present invention.

FIG. 5 is a block diagram for illustrating a schematic configuration of an engine controller in the second embodiment of the present invention.

The information measured by the various sensors 3, 4, 6, 9, 16, 17, 18, and 226 are input to the ECU 200.

The ECU 200 further outputs instruction values to the various actuators 5, 10, 11, 12, and 227.

The ECU 200 also comprises a turbocharger controller 60 configured to control the turbocharger 222 through the waste gate valve 227. The ECU 200 further comprises an exhaust gas flow rate calculator 71 configured to calculate the exhaust gas flow rate Qex of the exhaust gas discharged from the cylinder 13 of the engine 1 based on the cylinder intake air flow rate Qcr and the air-fuel ratio AF of the engine 1.

<Turbocharger Controller 60>

The turbocharger controller 60 comprises an upstream-of-throttle pressure calculator 61, a compressor driving force calculator 62, a before-and-after-turbine pressure ratio calculator 63, an upstream-of-turbine pressure calculator 64, and a waste gate valve controller 65.

(Upstream-of-Throttle Pressure Calculator 61)

The upstream-of-throttle pressure calculator 61 calculates an upstream-of-throttle pressure P2 based on the rotational speed Ne of the engine 1 measured by the crank angle sensor 18, the volumetric efficiency correction coefficient Kv calculated by the volumetric efficiency correction coefficient calculator 53, and a charging efficiency Ec. The upstream-of-throttle pressure P2 may instead be measured from the pressure sensor 226 provided upstream of the throttle.

(Compressor Driving Force Calculator 62)

The compressor driving force calculator 62 calculates a compressor driving force Pc based on the upstream-of-throttle pressure P2 calculated by the upstream-of-throttle pressure calculator 61 and the engine intake air flow rate Qar measured by the air flow sensor 3.

(Before-and-after-Turbine Pressure Ratio Calculator 63)

The before-and-after-turbine pressure ratio calculator 63 calculates a before-and-after-turbine pressure ratio P3/P4, which is a pressure ratio between pressures before and after the turbine 223. The compressor driving force Pc is achieved by the before-and-after-turbine pressure ratio P3/P4.

(Upstream-of-Turbine Pressure Calculator 64)

The upstream-of-turbine pressure calculator 64 calculates a downstream-of-turbine pressure P4 based on the exhaust gas flow rate Qex calculated by the exhaust gas flow rate calculator 71, and then calculates an upstream-of-turbine pressure P3 based on the downstream-of-turbine pressure P4 and the before-and-after-turbine pressure ratio P3/P4.

(Waste Gate Valve Controller 65)

The waste gate valve controller 65 calculates a target compressor driving force in consideration of the target torque of the engine 1 based on information including, for example a rotational speed of the engine 1 and an accelerator opening degree measured by the accelerator opening degree sensor (not shown), etc.

The waste gate valve controller 65 duty-controls an opening degree of the waste gate valve 227 based on the calculated target compressor driving force and the calculated exhaust gas flow rate Qex so that the compressor driving force Pc becomes equal to the target compressor driving force.

(Exhaust Gas Flow Rate Calculator 71)

The exhaust gas flow rate calculator 71 calculates the exhaust gas flow rate Qex based on the cylinder intake air amount calculated by the cylinder intake air amount calculator 54 and the air-fuel ratio AF measured by the air-fuel ratio sensor 16.

<Calculation of Exhaust Gas Flow Rate Qex>

Next, Calculation of the exhaust gas flow rate Qex, which is performed by the exhaust gas flow rate calculator 71 in the second embodiment of the present invention, is described with reference to a flow chart of FIG. 6.

Figure 6:
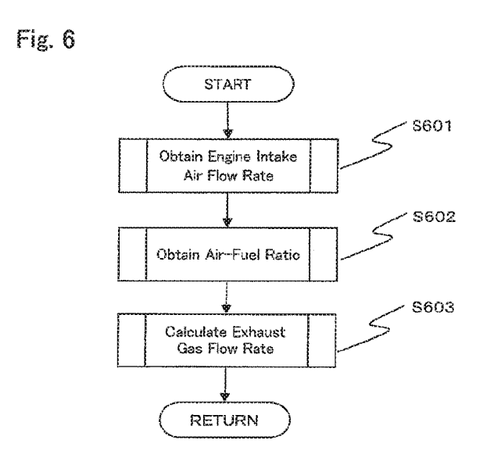
FIG. 6 is a flow chart for illustrating processing for calculating an exhaust gas flow rate in the second embodiment of the present invention.

The processes of the flowchart of FIG. 6 are executed as an interruption of the ECU 200 at a regular cycle period.

In Step S601 and Step S602, the exhaust gas flow rate calculator 71 obtains the engine intake air flow rate Qar measured by the air flow sensor 3 and the air-fuel ratio AF measured by the air-fuel ratio sensor 16, and stores the engine intake air flow rate Qar(n) and the air-fuel ratio AF in the internal memory of the ECU 200.

In Step S603, the exhaust gas flow rate calculator 71 calculates the exhaust gas flow rate Qex based on the engine intake air flow rate Qar.

Specifically, the exhaust gas flow rate calculator 71 calculates the cylinder intake air flow rate Qcr based on the engine intake air flow rate Qar, and then calculates the exhaust gas flow rate Qex based on the cylinder intake air flow rate Qcr and the air-fuel ratio AF according to Equation (9).

$$Qex = \frac{Qcr}{\Delta T}\left(1 + \frac{1}{AF}\right) \quad (9)$$

In Equation (9), the engine intake air flow rate Qar may be used in place of Qcr/ΔT. Also, a target value of the air-fuel ratio AF, which is used for fuel calculation, may be used as the air-fuel ration AF.

<Calculation of Upstream-of-Turbine Pressure P3>

Next, Calculation of the upstream-of-turbine pressure P3, which is performed by the turbocharger controller 60 in the second embodiment of the present invention, is described with reference to a flow chart of FIG. 7.

Figure 7:
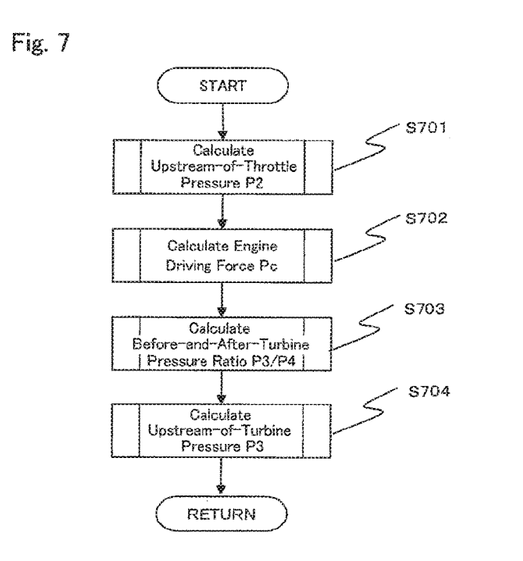
FIG. 7 is a flow chart for illustrating processing for calculating an upstream-of-turbine pressure in the second embodiment of the present invention.

The processes of the flowchart of FIG. 7 are executed as an interruption of the ECU 200 every time the crank angle of the engine 1 becomes a predetermined angle.

In Step S701, the upstream-of-throttle pressure calculator 61 calculates the upstream-of-throttle pressure P2 based on the rotational speed Ne of the engine 1 measured by the crank angle sensor 18, the volumetric efficiency correction coefficient Kv calculated by the volumetric efficiency correction coefficient calculator 53, and the charging efficiency Ec. The upstream-of-throttle pressure P2 may instead be measured from the pressure sensor 226 provided upstream of the throttle.

In Step S702, the compressor driving force calculator 62 calculates the compressor driving force Pc based on the upstream-of-throttle pressure P2 calculated by the upstream-of-throttle pressure calculator 61 and the engine intake air flow rate Qar measured by the air flow sensor 3.

In this case, regarding the flows in the compressor 221 and the turbine 223, a turbine output Pt (W) of the turbine 223 and the compressor driving force Pc (W) are calculated according to Equation (10) in consideration of, for example the law of conservation of mass which is a physical law relating to a state P-24E of air, a polytropic change, and an adiabatic efficiency, etc.

$$P_t = Q_t \cdot w_t \cdot \eta_t = \quad (10)$$
$$Q_t \cdot c_p T_3 \cdot \eta_t \left(1 - \left(\frac{P_4}{P_3}\right)^{\frac{\kappa-1}{\kappa}}\right) = Q_t \cdot \eta_t \cdot \frac{\kappa}{\kappa-1} RT_3 \left(1 - \left(\frac{P_4}{P_3}\right)^{\frac{\kappa-1}{\kappa}}\right)$$

-continued $$P_c = \frac{Q_{cmp} \cdot w_c}{\eta_c} = Q_{cmp} \cdot \frac{c_p T_1}{\eta_c}\left(\left(\frac{P_2}{P_1}\right)^{\frac{\kappa-1}{\kappa}} - 1\right) =$$

$$Q_{cmp} \cdot \frac{1}{\eta_c} \cdot \frac{\kappa}{\kappa-1} RT_1\left(\left(\frac{P_2}{P_1}\right)^{\frac{\kappa-1}{\kappa}} - 1\right)$$

$$\left(\because c_p = \frac{\kappa}{\kappa-1}R\right)$$

In Equation (10), Cp represents specific heat at constant pressure (kJ/(KG·K)), T represents an absolute temperature [K], Wt represents output (J) from the turbine 223 per unit flow rate, Wc represents compressor work (J), K represents a ratio of specific heat, Q represents a mass flow rate (g/s), R represents a gas constant (kJ/(KG·K)), ηt represents an adiabatic efficiency of the turbine 223, and ηc represents an adiabatic efficiency of the compressor 221.

Under a steady state, Qcmp=Qar is established between a flow rate Qcmp of air flowing through a compressor and the engine intake air flow rate Qar. In such a case, the compressor driving force Pc can be calculated alternatively according to Equation (11) using the engine intake air flow rate Qar and the upstream-of-throttle pressure P2.

$$P_c = Q_a \cdot \frac{\kappa}{\kappa-1} RT_1\left(\left(\frac{p_2}{p_1}\right)^{\frac{\kappa-1}{\kappa}} - 1\right) \tag{11}$$

In Step S703, the before-and-after-turbine pressure ratio calculator 63 calculates the before-and-after-turbine pressure ratio P3/P4, which is a pressure ratio between pressures before and after the turbine 223.

Specifically, the before-and-after-turbine pressure ratio calculator 63 has a turbine pressure ratio map MAP3, in which a relationship between the turbine output Pt and the before-and-after-turbine pressure ratio P3/P4 is previously stored. In addition, there is a strong correlation between the turbine output Pt and the before-and-after-turbine pressure ratio P3/P4.

The before-and-after-turbine pressure ratio calculator 63 uses the turbine pressure ratio map MAP3 to calculate the before-and-after-turbine pressure ratio P3/P4 corresponding to the compressor driving force Pc according to Equation (12).

$$P3/P4 = MAP3(Pc) \tag{12}$$

Depending on the characteristics of the turbocharger 222, a correlation between the before-and-after-turbine pressure ratio P3/P4 and a before-and-after-compressor pressure ratio P2/P1 may be stronger than a correlation between the before-and-after-turbine pressure ratio P3/P4 and the compressor driving force Pc.

In such a case, the before-and-after-turbine pressure ratio calculator 63 may use a turbine pressure ratio map MAP3', in which a relationship between the before-and-after-compressor pressure ratio P2/P1 and the before-and-after-turbine pressure ratio P3/P4 is previously stored, to calculate the before-and-after-turbine pressure ratio P3/P4 corresponding to the before-and-after-compressor pressure ratio P2/P1 according to Equation (13).

$$P3/P4 = MAP3'(P2/P1) \tag{13}$$

The turbine pressure ratio maps MAP3 and MAP3' can be created based on experimental data measured by the turbocharger 222 alone under a state in which the turbocharger 222 is not assembled to the engine 1.

In Step S704, the upstream-of-turbine pressure calculator 64 calculates the downstream-of-turbine pressure P4 based on the exhaust gas flow rate Qex calculated by the exhaust gas flow rate calculator 71, and then calculates the upstream-of-turbine pressure P3 based on the downstream-of-turbine pressure P4 and the before-and-after-turbine pressure ratio P3/P4.

Specifically, the upstream-of-turbine pressure calculator 64 has a downstream-of-turbine pressure ratio map MAP4, in which a relationship between the exhaust gas flow rate Qex and an atmospheric pressure-pressure ratio P4/P1 being a pressure ratio between the downstream-of-turbine pressure P4 and the atmosphere pressure P1 is previously stored, and calculates the atmospheric pressure-pressure ratio P4/P1 corresponding to the exhaust gas flow rate Qex according to Equation (14).

$$P4/P1 = MAP4(Qex) \tag{14}$$

The downstream-of-turbine pressure ratio map MAP4 can be created based on experimental data measured by the engine 1 under a state in which the turbocharger 222 is assembled to the engine 1.

Characteristics of the downstream-of-turbine pressure ratio map MAP4 are defined depending on exhaust resistances of, for example a catalyst and a muffler provided downstream of the turbocharger 222, and are therefore basic characteristics of the engine 1 that do not depend on specifications of the turbocharger 222. Therefore, the characteristics of the downstream-of-turbine pressure ratio map MAP4 can also be used even when there is a change in the specifications of the turbocharger 222.

Subsequently, the upstream-of-turbine pressure calculator 64 calculates the downstream-of-turbine pressure P4 based on the atmospheric pressure-pressure ratio P4/P1 and the atmosphere pressure P1 according to Equation (15).

$$P4 = (P4/P1) \times P1 \tag{15}$$

Subsequently, the upstream-of-turbine pressure calculator 64 calculates the upstream-of-turbine pressure P3 based on the downstream-of-turbine pressure P4 and the before-and-after-turbine pressure ratio P3/P4 according to Equation (16).

$$P3 = (P3/P4) \times P4 \tag{16}$$

The upstream-of-turbine pressure P3 calculated in this manner is a pressure on an upstream side of the turbine 223, and is equal to the exhaust manifold pressure Pex. That is, when the turbocharge 222 is mounted to the engine 1, the upstream-of-turbine pressure calculator 64 of the turbocharger controller 60 plays a role as means for calculating the exhaust manifold pressure Pex.

Once the exhaust manifold pressure Pex in the case where the turbocharger 222 is mounted has been calculated, the intake air amount controller 50 can use a ratio between the intake manifold pressure Pim and the exhaust manifold pressure Pex to calculate the pressure ratio Rpkv (=Pim/Pex1) for the volumetric efficiency correction coefficient as described in the first embodiment. Please see Step S303 of FIG. 3.

As described above, the control device for an internal combustion engine according to the second embodiment of the present invention can calculate the exhaust manifold pressure Pex in the case where the supercharger is mounted to the internal combustion engine. Accordingly, even when the supercharger is mounted to the internal combustion engine, the cylinder intake air amount being the amount of air sucked into the cylinder from the intake pipe can be calculated with high precision.

What is claimed is:

1. A control device for an internal combustion engine, the control device comprising:
    an engine intake air amount calculator configured to calculate an engine intake air amount being an amount of air sucked into an intake pipe of the internal combustion engine;
    an intake manifold pressure measurer configured to measure an intake manifold pressure of the internal combustion engine;
    an exhaust manifold pressure calculator configured to calculate an exhaust manifold pressure of the internal combustion engine;
    a rotational speed measurer configured to measure a rotational speed of the internal combustion engine;
    a variable valve controller configured to variably control an actuation state of at least one of an intake valve and an exhaust valve of the internal combustion engine;
    a volumetric efficiency correction coefficient calculator configured to calculate a volumetric efficiency correction coefficient for associating the engine intake air amount with a cylinder intake air amount that represents an amount of air sucked into a cylinder of the internal combustion engine from the intake pipe, based on a pressure ratio between the intake manifold pressure and the exhaust manifold pressure, the rotational speed, and the actuation state of the intake valve and the exhaust valve of the internal combustion engine; and
    a cylinder intake air amount calculator configured to calculate the cylinder intake air amount based on the engine intake air amount and the volumetric efficiency correction coefficient,
    wherein the control device is configured to perform fuel control and ignition control of the internal combustion engine based on the cylinder intake air amount that is calculated by using the engine intake air amount and the volumetric efficiency correction coefficient.

2. The control device for an internal combustion engine according to claim 1,
    wherein the volumetric efficiency correction coefficient calculator has a first map in which a relationship of the rotational speed and the pressure ratio with respect to the volumetric efficiency correction coefficient is stored, and
    wherein the volumetric efficiency correction coefficient calculator calculates the volumetric efficiency correction coefficient based on the first map.

3. The control device for an internal combustion engine according to claim 2,
    wherein the volumetric efficiency correction coefficient calculator has, in association with the actuation state of at least one of the intake valve and the exhaust valve, a plurality of maps, in each of which the relationship of the rotational speed and the pressure ratio with respect to the volumetric efficiency correction coefficient is stored.

4. The control device for an internal combustion engine according to claim 2,
    wherein the volumetric efficiency correction coefficient calculator has a second map in which a relationship of the rotational speed and the pressure ratio in a reference actuation state of at least one of the intake valve and the exhaust valve with respect to the volumetric efficiency correction coefficient is stored, and
    wherein the volumetric efficiency correction coefficient calculator corrects the volumetric efficiency correction coefficient stored in the second map based on a deviation between the reference actuation state and a most recent actuation state of at least one of the intake valve and the exhaust valve.

5. The control device for an internal combustion engine according to claim 1,
    wherein the exhaust manifold pressure calculator has a map in which a relationship between an exhaust gas flow rate and an atmospheric pressure-pressure ratio being a pressure ratio between the exhaust manifold pressure and an atmospheric pressure is stored, and
    wherein the exhaust manifold pressure calculator calculates the exhaust manifold pressure based on the map.

6. The control device for an internal combustion engine according to claim 1,
    wherein a supercharger is mounted to the internal combustion engine, and
    wherein the exhaust manifold pressure calculator calculates an upstream-of-turbine pressure being a pressure on an upstream side of a turbine of the supercharger, and sets the upstream-of-turbine pressure as the exhaust manifold pressure.

* * * * *